United States Patent [19]

Iwami

[11] Patent Number: 4,784,434

[45] Date of Patent: Nov. 15, 1988

[54] VEHICLE SEAT WITH SUSPENSION DEVICE

[75] Inventor: Kunihide Iwami, Akishima, Japan

[73] Assignee: Tachi-S Co., Tokyo, Japan

[21] Appl. No.: 42,317

[22] Filed: Apr. 24, 1987

[51] Int. Cl.$^4$ .............................................. B60R 21/00
[52] U.S. Cl. .................................... 297/216; 248/429; 297/345
[58] Field of Search ................ 248/429, 301; 297/345, 297/216

[56] References Cited

U.S. PATENT DOCUMENTS

| | | | |
|---|---|---|---|
| 4,008,917 | 2/1977 | Sigworth et al. | 297/216 |
| 4,092,009 | 5/1978 | Koutsky | 297/345 |
| 4,262,963 | 4/1981 | Bauer et al. | 248/429 X |
| 4,483,504 | 11/1984 | Duwelshoft | 248/429 |

FOREIGN PATENT DOCUMENTS

| | | | |
|---|---|---|---|
| 2263214 | 7/1973 | Fed. Rep. of Germany | 297/216 |
| 51315 | 7/1919 | Sweden | 248/301 |

*Primary Examiner*—James T. McCall
*Attorney, Agent, or Firm*—Oldham & Oldham Co.

[57] ABSTRACT

Disclosed is a vehicle seat with suspension device in which there is fixed a belt anchor to be jointed with a seat belt and the suspension device is adapted for absorbing a vibration or shock. In such seat, there are a pair of protection plates arranged such that they are respectively fixed on the rearward portions of the upper and lower frames of the suspension device and are disposed in a vertically mutually meeting relationship. Each of the protection plates are at its end portion formed with a curved or bent engagement terminal portion so arranged that both engagement terminal portions of both protection plates are in a halfway engagement with each other, with a predetermined distance present between their extremities and innermost curved portions. This arrangement allows a pulling force exerted on the belt anchor to be transmitted through the protection plates to the vehicle floor and received by the same.

5 Claims, 2 Drawing Sheets ary purpose of th present invention to
VEHICLE SEAT WITH SUSPENSION DEVICE

BACKGROUND OF THE INVENTION

1. Field of the Invention

The present invention relates to a vehicle seat with a suspension device, and in particular to an improvement of such vehicle seat provided thereunder with a suspension mechanism for resiliently supporting the seat to absorb vibration or shock caused in the case of driving a vehicle or automobile on a bad road and so forth.

2. Description of the Prior Art

In general, a suspension device of this type is of such a typical structure that X-shaped links are provided between an upper frame fxied on the bottom of a seat and a lower frame fixzed on the side of vehicle floor, so that the upper frame is vertically movable via the X-shaped links relative to the lower frame, and a spring is extended between the X-shaped links and those frames, with a shock absorber being interposed between the upper and lower frames, whereby with this structure suspension action is performed by virtue of the spring and shock absorber.

Such suspension device is mounted on currently available various seats for vehicles.

In those particular seats, a problem has been found in a seat belt anchor provided thereon, in that the structure of the belt anchor involves a high possibility, when a great impact is applied, of causing a damage to the suspension device and of pulling the seat belt so strongly as to give an excessive pressure to an occupant on the seat. In other words, for example, in the case of the belt anchor fixed on the seat or the upper frame of the suspension device, when a collision accident occurs, a reaction force exerted by the occupant is directly transmitted to the suspension device, resulting in the breakage of the suspension device which may be a critical cause that the occupant will be thrown out. On the other hand, in the case of the belt anchor fixed on the side of vehicle floor, the vertical movement of the suspension device, even in driving on a normal road, causes undesired excessive fastening of the seat belt around the occupant.

In view of such problem, there has been proposed a dual belt anchor structure consisting of a first belt anchor fixed on the seat or the upper frame of suspension device and a second belt anchor fixed on the side of vehicle floor, wherein the first belt anchor is connected with the second belt anchor via a second belt or link, so that, in a collision accident, a reaction force exerted by the occupant to the seat belt is transmitted and escaped to the vehicle floor.

However, the above-mentioned dual belt anchor structure employed in conventional seat with suspension device is found disadvantageous in its complexity due to the fact that the two belt anchors as well as the second belt or link are required for installation of a seat belt on the seat, and further has a shortcoming in that the second belt needs to be adjusted its length so as to be loosened, considering the stroke amount of vertical movement of the suspension device as well as the movement range of slide rails, and the degree of loosening of the second belt varies depending on different forward-/backward positions of the seat adjusted by the occupant, which makes the occupant feel uneasy about the unstable state of seat belt and hard to trust the seat belt in sitting on the seat.

SUMMARY OF THE INVENTION

It is a primary purpose of th present invention to provide an improved vehicle seat with suspension device which eliminates the above-described problem, having a simplified structure, and allows an occupant on the seat to be held and restrained positively and safely by a seat belt.

In order to attain the above-mentioned purpose, in accordance with the present invention, in such type of seat with the above-described suspension device, it is so constructed that there is fixed a belt anchor on the seat, which is joined to a seat belt, and there are provided a pair of protection plates so arranged that they are respectively fixed on the rearward portions of the upper frame and lower frame of the suspension device in a vertically mutually meeting relationship and each end portion of them is formed with a curved engagement terminal portion. The curved engagement terminal portion of the protection plates are faced towards each other and engaged halfway with each other in such a way that there exists a predetermined distance between the extremity of each curved engagement terminal portion and the innermost curved portion thereof.

By being so constructed, both curved engagement terminal portions of the protection plates are not interfered with each other in a normal state, and when a collision accident or similar abnormal state occurs, causing a reaction force of an occupant, which is in turn transmitted as a pulling force to his or her seat belt and resulting in upward deformation of the upper frame of suspension device, then both the curved engagement terminal portions are fully engaged with each other to receive and transmit such pulling force to the floor so that the occupant is held and restrained onto the seat.

Further, since both protection plates cover the suspension mechanism provided at the front seat, an occupant on rear seat is protected against such trouble that his or her foot is caught in the suspension mechanism.

These and other objects and many of the attendant advantages of the present invention will be readily appreciated as the same becomes better understood by referring to the following detailed description when considered in connection with the accompanying drawings.

DETAILED DESCRIPTION OF PREFERRED EMBODIMENTS OF THE INVENTION

Figure 1:
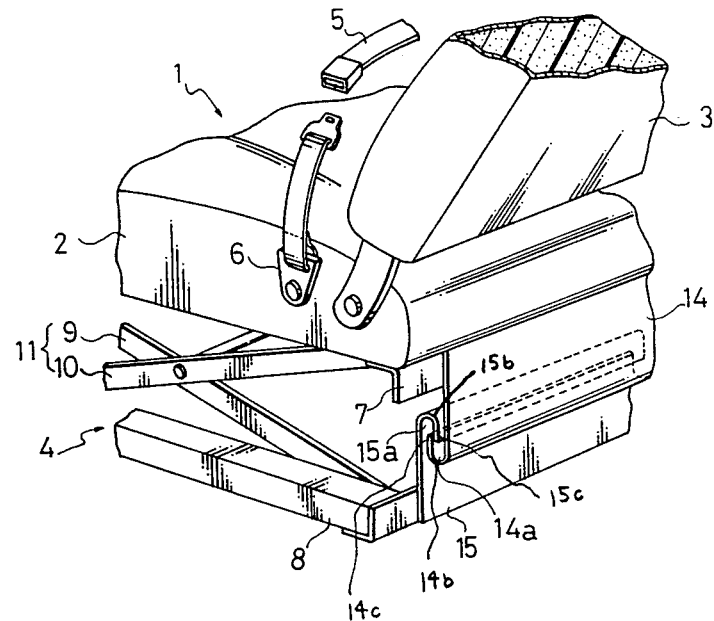
FIG. 1 is a perspective view showing the principal portion of seat with suspension device in accordance with the present invention.
Figure 2:
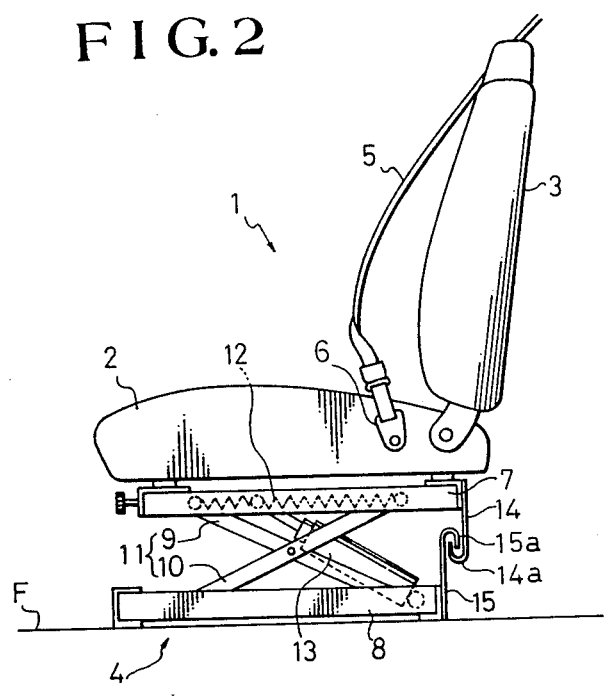
FIG. 2 is a side view of the seat with suspension device in FIG. 1.
Figure 3:
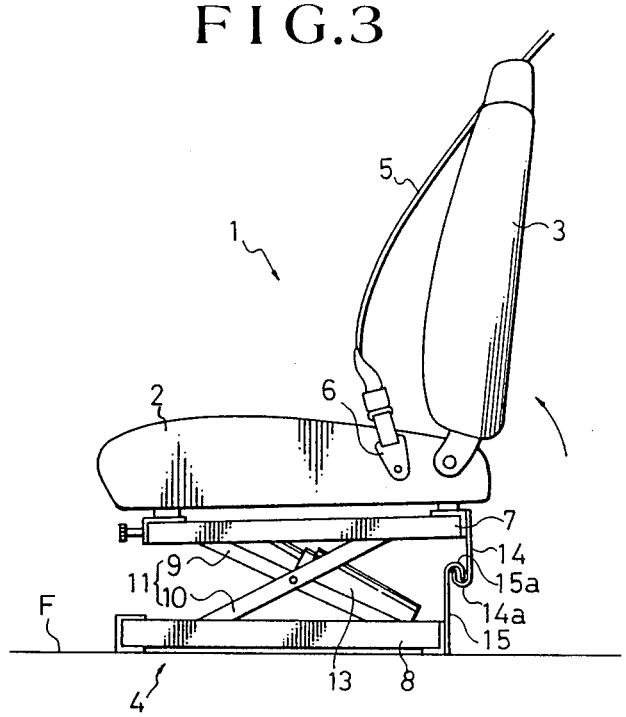
FIG. 3 is a side view showing the state in which the principal portion of the invention is in an operative condition.

With reference to FIGS. 1 through 3, there is illustrated one embodiment of the present invention, which will now be described hereinafter.

In those figures, reference numeral (1) stands for an automotive seat essentially composed of a seat cushion (2) and a seat back (3). The seat (1) is fixed on a floor (F) of an automobile. Between the seat cushion (2) and the floor (F), provided is a suspension device (4). A belt anchor (6) is mounted on the rearward portion of the lateral wall of the seat cushion (2), and is connected to the free end of a seat belt (5) which is adapted for holding and restraining an occupant to the seat (1). The seat belt (5), although not shown in the drawings, has a base portion which is normally stored windingly in a retractor and fixed at its end to a center pillar of automobile.

The suspension device (4) comprises an upper frame (7) fixed on the bottom surface of the seat cushion (2), a lower frame (8) fixed on the side of the floor (F), an X-shaped link (11) formed by a pair of link pieces (9)(10) which are pivotally connected with each other in a crossed manner, a tension coil spring (12) extended between one of those frames (for example, the upper frame (7)) and one of those link pieces (for example, one end of the link piece (9)), and a shock absorber (13) provided between the upper and lower frames (7)(8)). The X-shaped link (11) is interposed between the upper and lower frames (2)(8) in such a manner that the upper frame (2) is so supported by the X-shaped link (11) as to be vertically movable relative to the lower frame (8).

Rearwardly of the foregoing suspension device (4), are arranged a pair of protection plates (14)(15). Sepcifically, the protection plates (14) and (15) are respectively fixed to the rearward portion of the upper frame (7) and that of the lower frame (8), with the plate (14) extending downwardly and the plate (15) extending upwardly such as to be faced to each other in a vertical direction. Such arrangement of the protection plates (14)(15) is adopted here with a view to providing a safety structure for an occupant on a rear seat of the automobile so that his or her foot is not caught in between the suspension device. In the present embodiment, the protection plates (14)(15) are formed of a rigid plate-like material having a great mechanical strength, such as a metallic plate or the like, and are at their respective end portions formed with curved engagement terminal portions (14a)(15a) of a U-shaped configuration. The curved engagement terminal portions (14a)(15a) are respectively comprised of innermost curved portions (14b) (15b) and extremities (14c)(15c), such that the extremities (14c)(15c) are disposed in a mutually faced relation and oriented in a direction opposite to each other. In a normal state, both engagement terminal portions (14a)(-15a) are halfway engaged with each other, with a predetermined distance present between their respective extremities (14c)(15c) and innermost curved portions (14b)(15b), so that the engagement terminal portions (14a)(15a) are not interfered with each other. Thus, in a normal driving on the seat, the upper frame (7) is allowed to move vertically in a free manner relative to the lower frame (8).

On the other hand, when such an abnormal state as a collision accident takes place, forcing the upper frame (7) upwardly beyond a tolerable degree, then the engagement terminal portions (14a)(15a) are brought to a full engagement with each other, with their extremities (14c) (15c) being respectively in contact with their innermost curved portions (14b)(15b), whereupon the upper frame (7) is thereby prevented from its further upward movement.

The engagement terminal portions (14a)(15b) may be adjusted in dimensions of its curved or bent configuration (in this embodiment, they are of a U-shaped one) so that the extremities (14c)(15c) thereof may extend so longer as to be positioned adjacent to the innermost curved portions (14b)(15b).

Now, the practical operation of the above-discussed present invention will be described as below.

At first, an occupant sitting on the seat (1) passes the seat belt (5) on his or her body and joints it with the belt anchor (6).

In a normal driving by the occupant with the seat belt (5) fastened thereon, the suspension device (4) is worked freely in a usual manner to absorb vibration or shock, since the protection plates (14)(15) are in a disengaged state.

When a collision accident or other one takes place in such driving, giving an enormous impact to the occupant's automobile, a corresponding reaction force is caused from the occupant, which is transmitted to the seat belt (5) and in turn exerted as a pulling force of the seat belt (5) upon the upper frame (7). The upper frame (7) are then forced upwardly at its rearward portion, with the X-shaped link (11) being about to be deformed due to such movement of upper frame (7). At this time, however, the engagement terminal portions (14a)(15a) of the protection plates (14)(15) are brought into full engagement with each other, so that the upper frame (7) is thereby prevented from its further upward movement and thus its upward deformation. Accordingly, the suspension device (4) is prevented from being deformed and broken.

From the above description, it is seen that, when a great impact is applied due to such collision accident or the like, the belt anchor (6) is kept unmoved with respect to the vehicle floor (F) by the protection plates (14)(15), and as such, a pulling load, or pulling force caused in the seat belt (5) is transmitted through the protection plates (14)(15) to the floor (F) and received by the same, whereby the occupant is positively held and restrained by the seat belt (5) and prevented from being thrown out of the seat (1). The occupant on the seat (1) is therefore protected with safety.

Also, it will be appreciated that the extremities (14c)(15c) of the engagement terminal portions (14a)(-15a) may be so formed that they extends a relatively longer toward the respective innermost curved portions (14b)(15b) thereof and are disposed in a crossing relation, to thereby ensure a more positive engagement of those tow protection plates (14)(15) when a great impact is applied.

Figure 4:
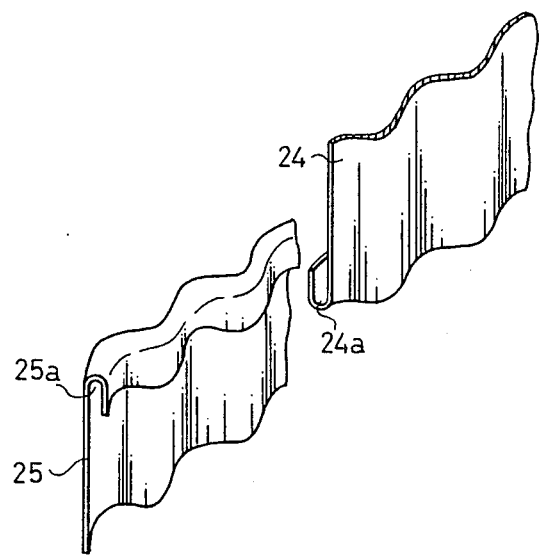
FIG. 4 is an exploded perspective view of another embodiment of protection plates in accordance with the present invention.

Referring now to FIG. 4, there is shown another embodiment of protection plates in accordance with the present invention, in which are illustrated a pair of protection plates (24)(25) each being formed in a corrugated fashion. The engagement terminal portions (24a)(25a) of the protection plates (24)(25) are formed by bending the respective corrugated protection plates (24)(25) as it is.

In this embodiment, each of the engagement terminal portions (24a)(25a) are of a corrugated configuration as viewed in a plan sense and has a U-shaped configuration in section. Such corrugated formation serves as plural reinforcement ribs in the engagement terminal portions (24a)(25a) and enhances the flexural strength thereof. Further, it serves as a guide for both engagement terminal portions (24a)(25a) to be positively engaged together with no much clearance therebetween when a great impact and pulling force is applied as mentioned above. Therefore, when a collision accident or the like occurs, causing a pulling force of the seat belt and exerting it upon the upper frame of suspension deive, the upper frame is more positively prevented from its upward deformation and thus an occupant on the seat is also more positively held and restrained by the seal belt.

While having described the present invention, the configuration of the protective plates and the curved bent shape of their engagement terminal portions are not restricted to those mentioned above, but may be modified in a variety of shape within the definition and sprit of the present invention.

With the present invention constructed as above, even in the case of a great impact applied in a collision, a pulling force by an occupant upon the seat belt is transmitted through the vertically engaged protection plates to the vehicle floor and received by the same. Thus, the present invention permits an occupant to be positively held and restrained to his or her seat and provides a far-improved safety protection to the occupant. Moreover, it requires no such dual seat belt structure as in the conventional seat, namely, a second belt anchor, a second seat belt or the like, and therefore is quite simple in structure and can be assembled at a lower cost.

What is claimed is:

1. A vehicle seat with a suspension device in which there is fixed a belt anchor to be joined with a seat and the seat is supported by the suspension device and in which the suspension devise includes an upper frame and a lower frame, characterized in that there are provided a pair of protection plates so arranged that one of them is fixed on a rearward portion of said upper frame and the other of them is fixed on a rearward portion of said lower frame in such a manner that they are disposed in a vertically mutually meeting relationship, in that each free end portion of said protection plates is formed with a curved or bent engagement terminal portion disposed between said upper and lower frames, such that both said engagement terminal portions of said protection plates are faced toward each other, and in that each of said engagement terminal portions comprise an innermost portion in an extremity, whereby said protection plates are in a halfway engagement with each other, in such a way that a predetermined distance exists between said respective extremities and said respective innermost curved portion, of said engagement terminal portions and wherein said plates are fixed in a position in which they extend from one side to the other side of said frames at the rear thereof, substantially covering the entire space defined at the rear of said seat between said upper and lower frames.

2. The vehicle seat according to claim 1, wherein said suspension device comprises an upper frame fixed on a bottom side of a seat cushion of said seat, a lower frame fixed on a floor of the vehicle, and an X-shaped link provided between said upper and lower frames such that said seat cushion is movable vertically relative to said floor, and wherein on said upper frame there is fixed said belt anchor.

3. The vehicle seat according to claim 1, wherein said protection plates are formed of a rigid plate-like material and each of said protection plates is at its end portion formed with an engagement terminal portion of a U-shaped configuration, and wherein both said terminal portions are disposed in a vertically mutually meeting relationship.

4. The vehicle seat according to claim 1, wherein said protection plates are formed of a plane plate.

5. The vehicle seat according to claim 1, wherein said protection plates are formed of a rigid plate of a corrugated configuration.

* * * * *